(12) United States Patent
Griffiths et al.

(10) Patent No.: US 6,307,693 B1
(45) Date of Patent: Oct. 23, 2001

(54) INTEGRATION OF FILTER INTO READ/WRITE PREAMPLIFIER INTEGRATED CIRCUIT

(75) Inventors: Bernard James Griffiths, Ben Lomond; Derek Mellor, Santa Cruz, both of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 08/881,309

(22) Filed: Jun. 24, 1997

Related U.S. Application Data

(63) Continuation of application No. 08/543,211, filed on Oct. 13, 1995, now abandoned.

(51) Int. Cl.$^7$ .................................................... G11B 5/09
(52) U.S. Cl. .................................................... 360/46
(58) Field of Search ............................. 360/46, 65, 129; 375/348

(56) References Cited

U.S. PATENT DOCUMENTS

| | | | |
|---|---|---|---|
| 4,535,371 | * | 8/1985 | Marr et al. ........................ 360/46 X |
| 4,564,869 | * | 1/1986 | Baumeister ........................... 360/46 |
| 4,722,010 | * | 1/1988 | Suzuki et al. ........................ 360/46 |
| 4,989,212 | * | 1/1991 | Mecherle .............................. 372/26 |
| 5,237,463 | * | 8/1993 | Cronch et al. ....................... 360/46 |
| 5,270,875 | * | 12/1993 | Shah et al. ........................... 360/46 |
| 5,388,011 | * | 2/1995 | Tollum ................................. 360/46 |
| 5,519,548 | * | 5/1996 | Liepe et al. ....................... 360/46 X |

\* cited by examiner

Primary Examiner—Hoa T. Nguyen
Assistant Examiner—Regina Y. Neal
(74) Attorney, Agent, or Firm—Haverstock & Owens LLP (57) ABSTRACT

A magnetic media storage system output circuit includes a filter for filtering an analog output signal from the storage media system before the analog output signal is provided to a read channel. Within the magnetic media storage system a read/write head reads data from a magnetic medium and provides an analog signal representing the data to an output circuit. The output circuit includes the filter for filtering the analog output signal and a pre-amplifier circuit for amplifying and transmitting the analog output signal to a read channel. Preferably, the filter has a linear frequency response and constant group delay below the cutoff frequency. Current on a write current control pin is used to control the cutoff frequency of the filter so that the cutoff frequency will track the data rate. An output signal from the storage media system output circuit is provided to a read channel.

27 Claims, 7 Drawing Sheets

INTEGRATION OF FILTER INTO READ/WRITE PREAMPLIFIER INTEGRATED CIRCUIT

This is a Continuation of application Ser. No. 08/543,211 filed on Oct. 13, 1995, now abandoned.

FIELD OF THE INVENTION

The present invention relates to the field of storing data in and obtaining data from a magnetic media storage system. More particularly, the present invention relates to the field of obtaining data from the magnetic media storage system and transmitting data to a read channel.

BACKGROUND

In magnetic media storage systems for computers, such as hard disk drives, digital data is used to modulate the current in a read/write head coil so that a sequence of corresponding magnetic flux transitions are written onto a magnetic medium in data tracks. To read this recorded data, the read/write head passes over the magnetic medium and transduces the magnetic transitions into pulses of an analog signal that alternates in polarity. The analog signal is provided to and decoded by read channel circuitry to reproduce the digital data.

Within the read channel, decoding the pulses into a digital sequence is performed by a peak detector circuit in a conventional analog read channel or by using a discrete time sequence detector circuit in a sampled amplitude read channel. Threshold crossing or derivative information, implemented in analog circuitry, is normally used in conventional peak detection schemes to detect peaks in the continuous time analog signal generated by the read head. The analog read signal is "segmented" into bit cell periods and interpreted during these segments of time. The presence of a peak during the bit cell period is detected as a logical "1", whereas the absence of a peak during a bit cell period is detected as a logical "0".

Figure 1:
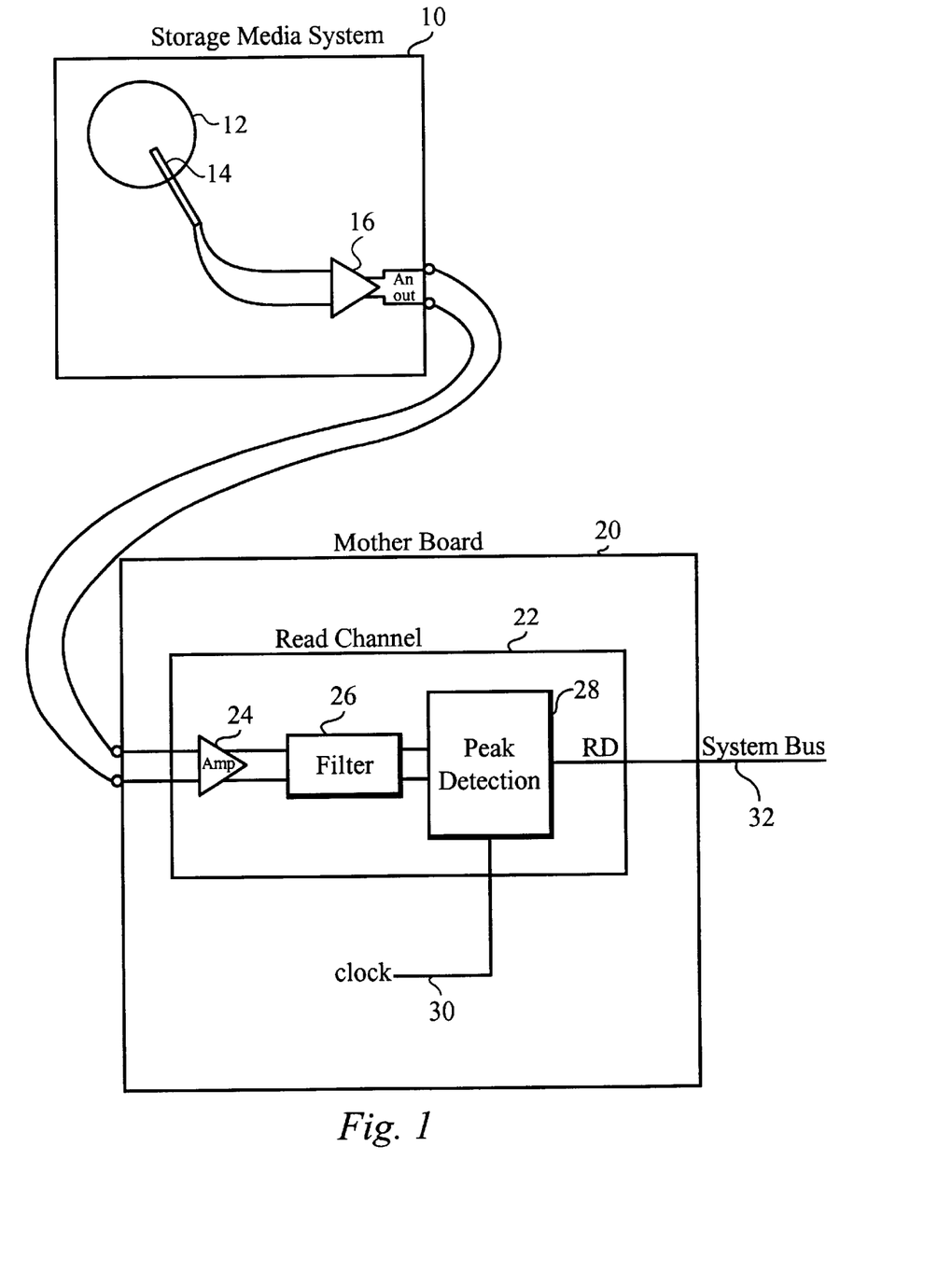
FIG. 1 illustrates a block diagram schematic of a storage media system and read channel.

A block diagram of a storage media system and a read channel is illustrated in FIG. 1. The storage media system 10 includes a storage medium 12, a read/write head 14 and a pre-amplifier 16. The read/write head 14 writes information to and reads information from the magnetic medium 12. While only a single storage medium 12 and read/write head 14 are shown in the block diagram of FIG. 1, it should be apparent to those skilled in the art that the storage media system may include multiple storage media and read/write heads from which data can be written to or read from. Within the storage media system 10, the read/write head 14 is coupled to the pre-amplifier circuit 16 to provide an analog output signal An Out representing the data read from the magnetic medium 12.

The read channel 22 is typically included on the motherboard 20 within the host system. Among other circuits, the read channel 22 includes an amplifier 24, a filter 26 and a peak detection circuit 28. The analog output signal An Out from the pre-amplifier circuit 16 is coupled as an input to the amplifier 24. An output of the amplifier 24 is coupled to the filter 26. An output of the filter 26 is coupled to the peak detection circuit 28. A clock signal 30 from the motherboard is also coupled to the peak detection circuit 28. A read channel output signal RD from the peak detection circuit 28 is coupled to a host system bus 32 in order to provide the digital representation of the analog signal output from the storage media system 10 to other components within the host system. This digital representation represents the data read from the storage medium 12.

Figure 2A:
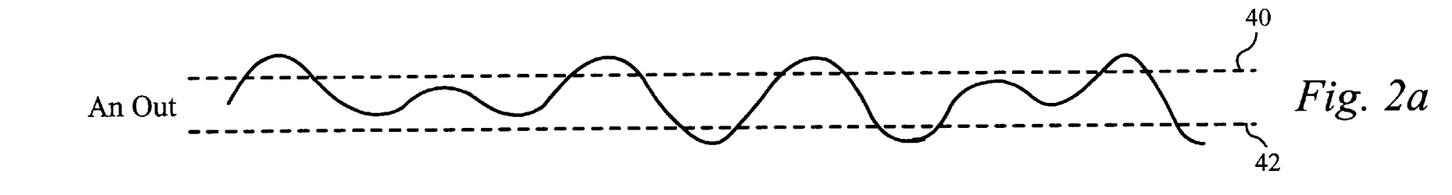
FIG. 2a illustrates a timing diagram of an analog output signal An Out which is output from a magnetic media storage system.
Figure 2B:
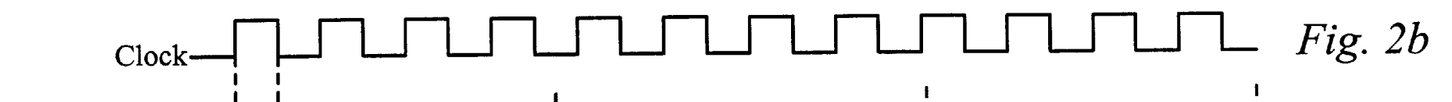
FIG. 2b illustrates a timing diagram of a clock signal provided to a peak detection circuit.
Figure 2C:
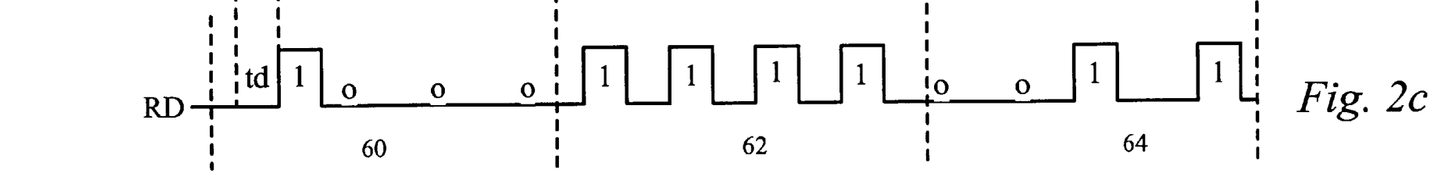
FIG. 2c illustrates a timing diagram of an output RD of the read channel.

A timing diagram of signals taken at various points within the system illustrated in FIG. 1 is illustrated in FIG. 2. A timing diagram of the analog output signal An Out of the amplifier 16 is illustrated in FIG. 2a. A timing diagram of the clock signal 30 is illustrated in FIG. 2b. A timing diagram of a read channel output signal RD corresponding to the analog output signal An Out is illustrated in FIG. 2c. The timing diagram of the read channel output signal RD is divided into three time segments 60, 62 and 64, each of which include four bits of information.

The analog output signal An Out, illustrated in FIG. 2a, shows an example of an analog signal read by the read/write head 14 from the magnetic media 12 representing data stored on the magnetic media 12. The analog output signal An Out is provided to the read channel 22 from the preamplifier circuit 16. Within the read channel 22, the analog output signal An Out is then amplified by the amplifier 24 and filtered by the filter 26 before it is converted to a digital data signal and output by the peak detection circuit 28. The peak detection circuit 28 segments the analog output signal An Out into bit cells, corresponding to the pulses of the clock signal 30 and each representing one bit of information. The presence of a peak, either above or below an appropriate one of the transition lines 40 and 42 during a bit cell, is detected by the peak detection circuit 28 as a logical "1." The absence of a peak during a bit cell, is detected by the peak detection circuit 28 as a logical "0." Other data recovery systems are also well known.

There is a delay td from the time the peak occurs during the bit cell to the time the read channel output signal RD transitions to a logical high voltage level. This delay td is referred to as a group delay. The frequency of transitions on the read channel output signal RD, as illustrated in FIG. 2c, changes from the time segment 60 to the time segment 62. During a time segment when there are few transitions to a logical high voltage level, such as the time segment 60, the frequency of the transitions is low. During a time segment when there are multiple sequential transitions to a logical high voltage level, such as the time segment 62, the frequency of the transitions is high. Because the time segment 62 includes four logical "1s", the read channel output signal RD has a higher frequency during this time segment 62 than during the time segment 60 which includes only a single logical "1." It is desirable in a read channel that the group delay time period td remains constant as the frequency of the read channel output signal RD is fluctuating.

The pre-amplifier circuit 16 is generally included within a read/write chip coupled inside the storage media system 10. Typically, the read/write chip is encapsulated in a surface mount package and bound by the specifications that it is to dissipate the minimum possible power and add the minimum possible spurious electrical noise to the signal. The small signals extracted from the magnetic media 12 by the read/write head 14 may also be accompanied by spurious signals induced through capacitive or inductive coupling and wide band noise. These spurious signals are typically eliminated to a first order by the filter 26 within the read channel 22.

The quality of the signal provided to the peak detection circuit 28 is extremely important to the correspondence of the read channel output signal RD to the data read from the magnetic media 12. Errors in detection will occur when the bit cells are not correctly aligned with the analog pulse data or the signal provided to the peak detection circuit 28 includes noise which causes extra peaks to be detected and output, causing the signal output by the read channel to differ from the data read from the magnetic media 12. It is important to preserve the quality of the signal output from the storage media system 10 through the read channel 22 in order to get a true digital representation of the data read from the storage medium 12.

SUMMARY OF THE INVENTION

A magnetic media storage system output circuit includes a filter for filtering an analog output signal from the storage media system before the analog output signal is provided to a read channel. Within the magnetic media storage system a read/write head reads data from a magnetic medium and provides an analog signal representing the data to an output circuit. The output circuit includes the filter for filtering the analog output signal and a pre-amplifier circuit for amplifying and transmitting the analog output signal to a read channel. Preferably, the filter has a linear frequency response and constant group delay below the cutoff frequency. Current on a write current control pin is used to control the cutoff frequency of the filter so that the cutoff frequency will track the data rate. An output signal from the storage media system output circuit is provided to a read channel.

DETAILED DESCRIPTION OF THE PREFERRED EMBODIMENT

A storage media system output circuit according to the present invention includes a filter and a pre-amplifier circuit within the storage media system in order to filter any unwanted frequencies from the analog output signal An Out before it is transmitted to the read channel 22. The filter within the storage media system output circuit is included to enhance the signal to noise ratio of the analog output signal An Out as it is transmitted to the read channel 22. This signal is then filtered again by the filter within the read channel. From the filter within the read channel, a higher quality signal is provided to the peak detection circuit 28 which will result in a higher quality read channel output signal RD and a more accurate digital representation of the data read from the magnetic medium.

Figure 3:
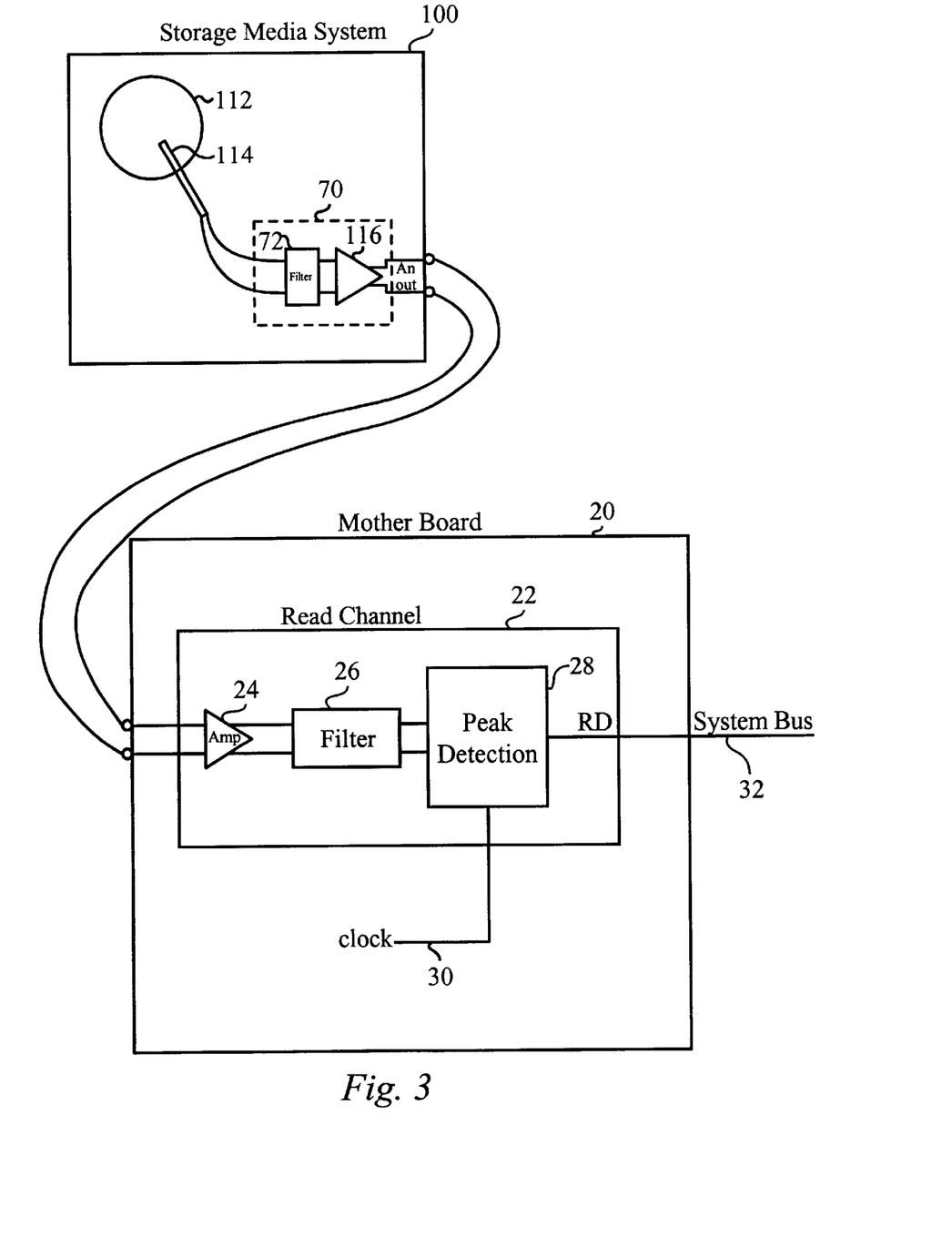
FIG. 3 illustrates a block diagram schematic of a storage media system and read channel including a filter within the storage media system according to the present invention.

A block diagram schematic of a storage media system according to the present invention and a read channel is illustrated in FIG. 3. The storage media system 100 of the present invention includes a storage medium 112, a read/write head 114 and an output circuit 70. The read/write head 114 writes information to and reads information from the magnetic storage medium 112. While only a single storage medium 112 and read/write head 114 are shown in the block diagram of FIG. 3, it should be apparent to those skilled in the art that the storage media system 100 may include multiple storage media and read/write heads from which data can be written to or read from.

Within the storage media system 100, the read/write head 114 is coupled to the output circuit 70 to provide an analog output signal An Out to the read channel 22, representing the data read from the magnetic medium 112. Within the output circuit 70, a filter 72 receives the output from the read/write head 114. An output from the filter 72 is coupled as an input to a pre-amplifier circuit 116. An output of the pre-amplifier circuit 116 provides the analog output signal An Out from the output circuit 70 and is coupled to the read channel 22. The read channel 22, illustrated in FIG. 3, is identical to the read channel 22 described above and illustrated in FIG. 1. It will be apparent to those of ordinary skill in the art that any conventional read channel can be used in a system that follows the teachings and accomplishes the goals of the present invention.

In order to enhance the quality of the output signal An Out provided to the read channel 22, the filter 72 preferably has a constant group delay within an acceptable frequency range in order to minimize the errors in detection of the bits read from the storage medium 112. The filter 72 also preferably has a linear frequency response over an appropriate range of frequencies. The filter 72 is designed to cutout noise at frequencies above the acceptable frequency range, due to interference which would otherwise erode the quality of the analog output signal An Out. In the preferred embodiment of the present invention, the filter 72 is a Bessel-type filter with a programmable cutoff frequency which tracks the data rate. Alternatively, the filter 72 could be any filter which has a sufficiently constant group delay and linear frequency response over an appropriate range of frequencies.

Figure 4:
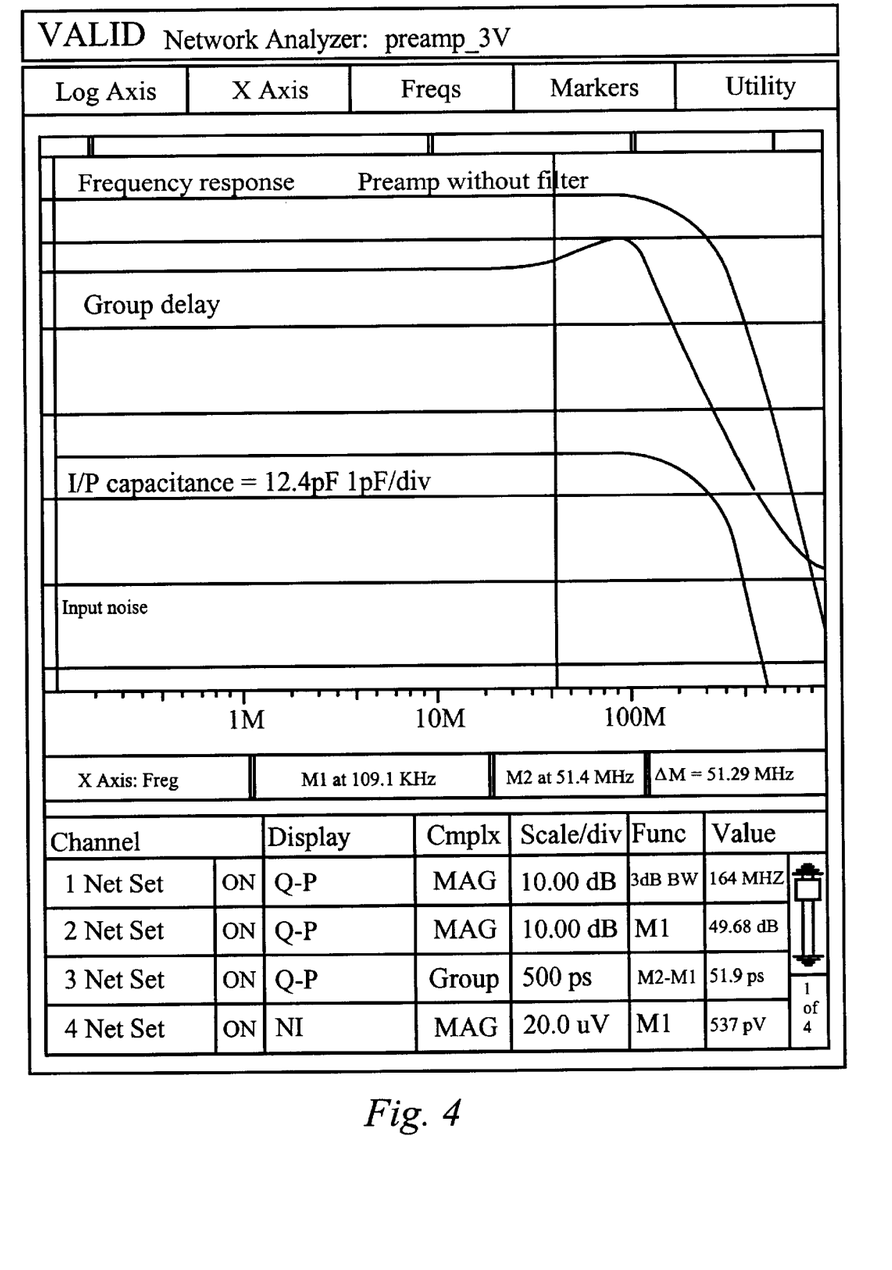
FIG. 4 illustrates a graph of properties of an output signal from an output circuit without any filter.

A graphical representation of properties of the output signal An Out over a range of frequencies from an output circuit 70 without any filter 72 is illustrated in FIG. 4. As shown, at higher frequencies, the frequency response of the output signal An Out begins to drop off and the group delay of the signal is not constant.

Figure 5:
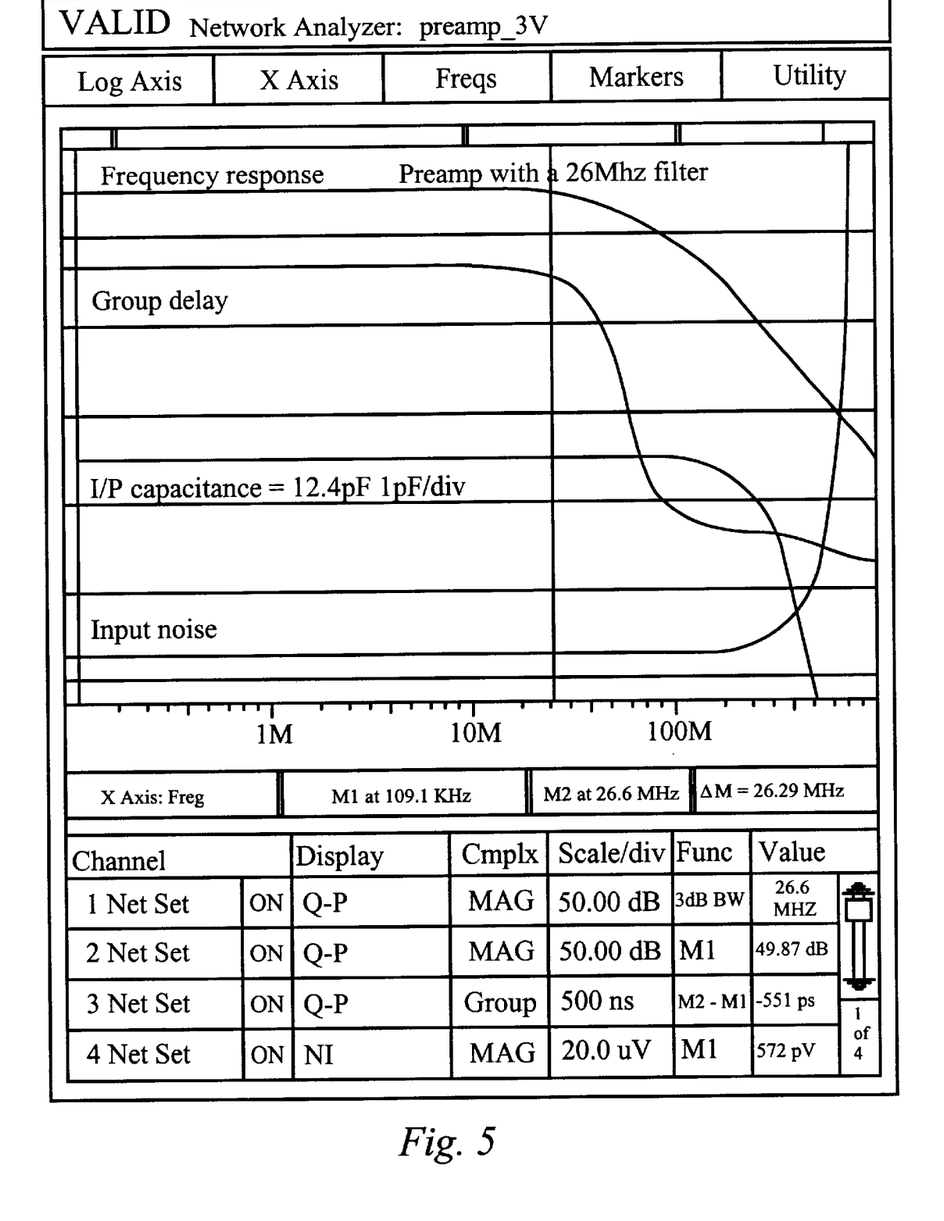
FIG. 5 illustrates a graph of properties of an output signal from an output circuit with a 25 MHz filter.

A graphical representation of properties of the output signal An Out over a range of frequencies from an output circuit 70 including a 25 MHz filter is illustrated in FIG. 5. Up until the cutoff frequency of 25 MHz, the frequency response and group delay of the output signal An Out are constant. Above the cutoff frequency of the filter, the group delay and the frequency response both exhibit sharp drop offs.

Figure 6:
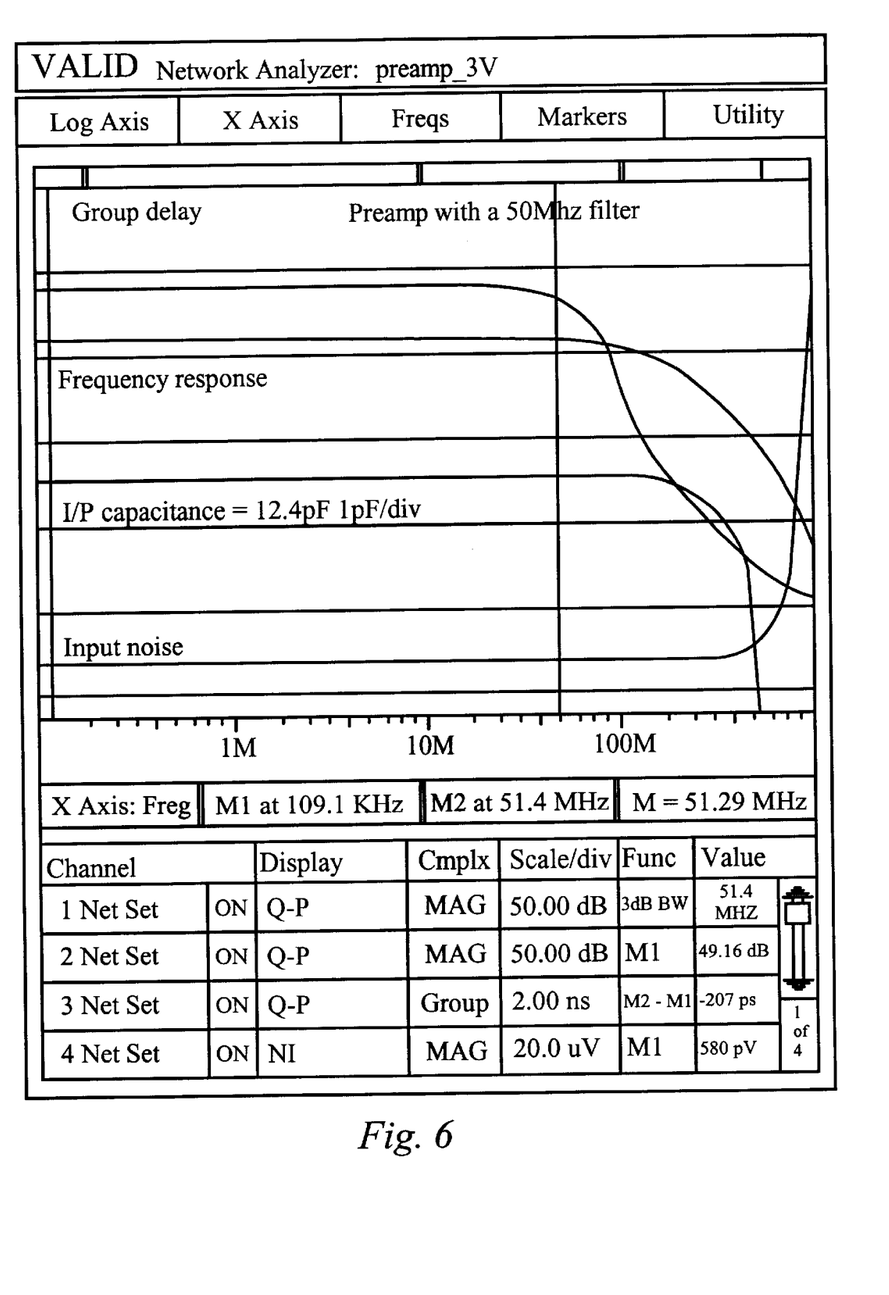
FIG. 6 illustrates a graph of properties of an output signal from an output circuit with a 50 MHz filter.

A graphical representation of properties of the output signal An Out over a range of frequencies from an output circuit 70 including a 50 MHz filter is illustrated in FIG. 6. Below the cutoff frequency of 50 MHz, the frequency response and group delay of the output signal An Out are constant. Above the cutoff frequency of the filter, the group delay and frequency response both exhibit sharp drop offs.

As illustrated, the use of a filter 72 within the output circuit 70 cuts out noise from high frequency signals, thereby enhancing the quality of the output signal An Out provided to the read channel 22. This signal is then again filtered by the filter 26 within the read channel 22. Accordingly, including the filter 72 within the output circuit 70 causes a higher quality signal to be provided to the peak detection circuit 28 and will correspondingly maximize the correspondence between the data output on the read channel output signal RD and the data read from the magnetic media 112.

Figure 7:
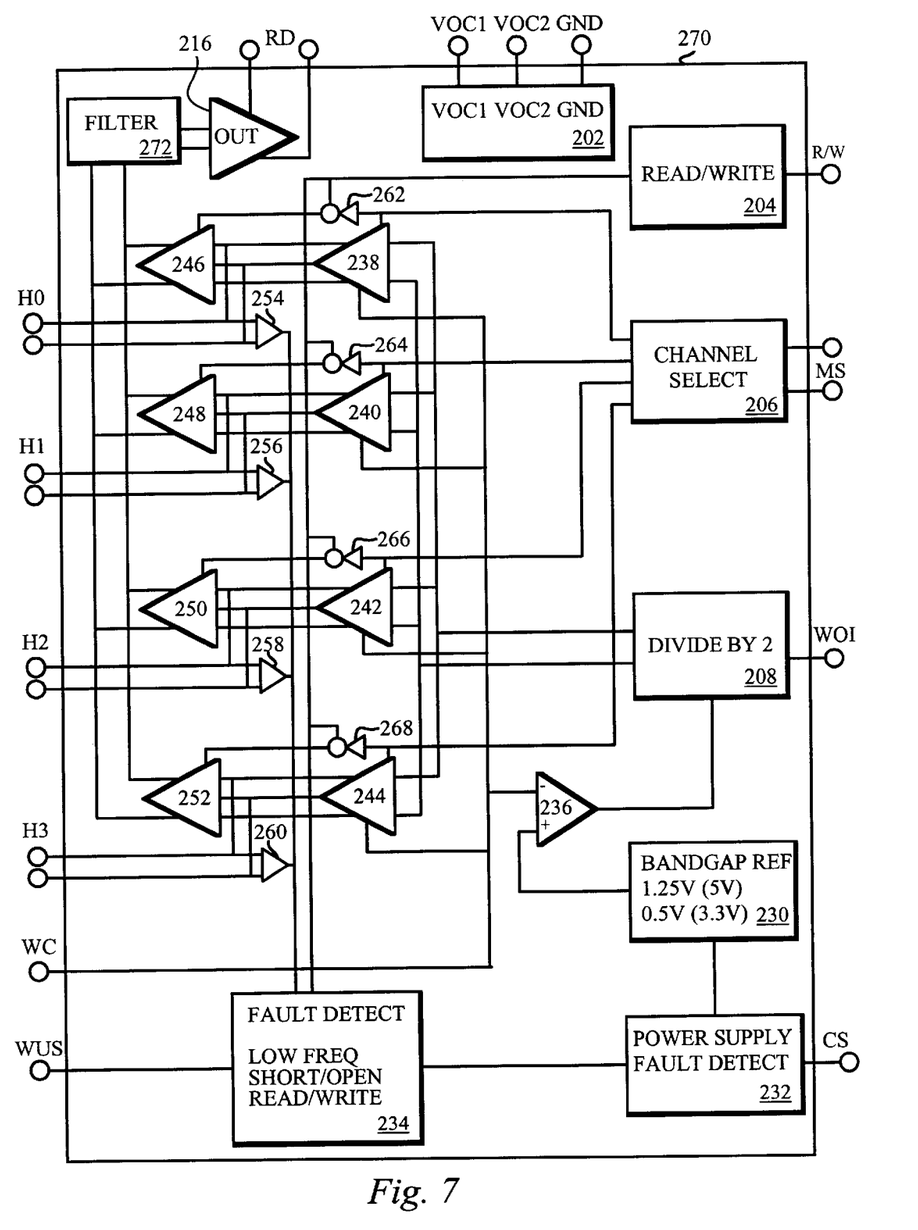
FIG. 7 illustrates a block diagram of a four channel read/write device of the preferred embodiment of the present invention.

A four-channel read/write circuit of the preferred embodiment of the present invention is illustrated in FIG. 7. A power supply circuit 202 within the read/write circuit 270 is coupled to the power supply pins VCC1 and VCC2 and to the ground pin GND. A read/write control circuit 204 is coupled to a read/write control pin R/W. An output of the read/write circuit 204 is coupled to each of the channel activation circuits 262, 264, 266 and 268 and as an input to a fault detect circuit 234. Head select pins HS are coupled as inputs to a channel select circuit 206. Outputs from the channel select circuit 206 are coupled to each of the channel read activation circuits 262, 264, 266 and 268 and to each write driver circuit 238, 240, 242 and 244 for controlling which of the four channels is activated for a read or write operation.

A write data input pin WDI is coupled to a divide-by-two circuit 208. Output lines of the divide-by-two circuit 208 are coupled as inputs to each write driver circuit 238, 240, 242 and 244 for providing data to be written on a magnetic media to the write driver circuits. A differential output of the write driver circuit 238 is coupled to read/write head pins H0. A differential output of the write driver circuit 240 is coupled to read/write head pins H1. A differential output of the write driver circuit 242 is coupled to read/write head pins H2. A differential output of the write driver circuit 244 is coupled to read/write head pins H3.

The read/write head pins H0 are coupled as inputs to a read driver circuit 246 and to a buffer stage 254. The read/write head pins H1 are coupled as inputs to a read driver circuit 248 and to a buffer stage 256. The read/write head pins H2 are coupled as inputs to a read driver circuit 250 and to a buffer stage 258. The read/write head pins H3 are coupled as inputs to a read driver circuit 252 and to a buffer stage 260. An output of each of the buffer stages 254, 256, 258 and 260 are coupled together and as an input to the fault detect circuit 234.

An output of the activation circuit 262 is coupled to the read driver circuit 246. An output of the activation circuit 264 is coupled to the read driver circuit 248. An output of the activation circuit 266 is coupled to the read driver circuit 250. An output of the activation circuit 268 is coupled to the read driver circuit 252. Outputs of each of the read driver circuits 246, 248, 250 and 252 are coupled together and as inputs to a filter circuit 272. An output of the filter circuit 272 is coupled as an input to an output pre-amplifier circuit 216. An output from the amplifier circuit 216 is coupled to the output pins RD.

A write control pin WC is coupled to each of the write driver circuits 238, 240, 242 and 244. The write control pin WC is also coupled to a negative input of a comparator 236. An output of a bandgap reference circuit 230 is coupled to a positive input of the comparator 236. An output of the comparator 236 is coupled to the divide-by-two circuit 208. A write unsafe pin WUS is coupled to the fault detect circuit 234. A power supply fault detect circuit 232 is coupled to an output pin CS. The fault detect circuit 234 is coupled to the power supply fault detect circuit 232. The power supply fault detect circuit 232 is also coupled to the bandgap reference circuit 230.

The signal on the head select pins HS specifies to the channel select circuit 206 which one of the four channels is to be activated. The channel select circuit 206 then sends a signal to an appropriate one of the channel activation circuits 262, 264, 266 and 268. The signal on the read/write pin R/W specifies to the read/write circuit 204 if a current operation to be performed is a read or a write operation. The read/write circuit 204 then sends a signal to the activation circuits 262, 264, 266 and 268 to specify that an appropriate read driver circuit or write driver circuit should be activated, depending on the channel selected. Accordingly, the appropriate read driver circuit or write driver circuit will send information to or receive information from the appropriate read/write head pins H0, H1, H2 or H3.

For a write operation to a magnetic medium coupled through a read/write head to the read/write head pins H1, the signal on the head select pins HS will specify that the channel 1 should be selected. The channel select circuit 206 will then send a signal to the activation circuit 264 signalling that the current operation is to take place through this channel. The signal on the read/write pin R/W specifies that this is a write operation. The read/write circuit 204 then sends a signal to the activation circuit 264 that the write driver circuit 240 is to be activated. The information to be written on the magnetic medium is provided through the write data pin WDI and the divide-by-two circuit 208 to the write driver circuit 240. The write driver circuit 240 then provides the information to the read/write head pins H1 which are coupled to a read/write head. According to the preferred embodiment the write current is fixed for each disk drive and does not vary depending upon the zone, but usually depends upon the head characteristics. The frequency is set by an external resistor or can be programmed by a serial interface or by a signal on the WC pin. The data is then transmitted from the write driver circuit 240 through the read/write head pins H1 to a corresponding read/write head. As an alternate embodiment, the write current can be provided from the write current pin WC to the write driver circuit 240. In a zone bit recording application, the write current is ideally an inverse function of the data rate, which in turn is a function of the relative position of the head on the medium.

During a read operation, the channel select circuit 206 sends a signal to an appropriate one of the activation circuits 262, 264, 266 or 268 and the read/write circuit 204 specifies that the appropriate one of the head driver circuits 246, 248, 250 or 252 is to be activated. The signal read from the magnetic medium is provided on the appropriate read/write head pins H0, H1, H2 or H3 and coupled to the activated read driver circuit 246, 248, 250 or 252. The output of the activated read driver circuit is then filtered by the filter 272, amplified by the output pre-amplifier circuit 216 and provided on the output pins RD. The output pins RD are coupled to the read channel circuit 22, as discussed above.

Preferably, the filter 272 is linear phase (constant group delay). For example, a Bessel type filter or equiripple type filter can be used at the filter 272. The cutoff frequency of the filter 272 in the preferred embodiment is programmed to track the data rate. In the preferred embodiment, the write current is fixed for each disk drive and does not vary depending upon the zone, but usually depends upon the head characteristics. The frequency is set by an external resistor or another convenient well known means. In the alternative, because of the relationship of the write current to the data rate, a cutoff control current is generated for the filter cutoff frequency. The cutoff control current is inversely proportional to the write current so that the filter cutoff frequency will track the data rate. This cutoff control current then controls the filter cutoff frequency without requiring an additional pin on the read/write circuit 270.

A read/write pre-amplifier circuit within a magnetic media storage system includes a filter for enhancing the quality of an analog output signal transmitted to a read channel. The filter includes a constant group delay and linear frequency response over an appropriate range of frequencies. The analog output signal is transmitted to a read channel where it is again filtered and then converted into a digital data stream representing the data read from the magnetic medium. Because of the filter included within the read/write pre-amplifier circuit, the signal transmitted to the read channel is enhanced because noise and spurious signals picked up from the medium are removed. Therefore, the digital representation output from the read channel is a more accurate representation of the data read from the magnetic medium.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that the placement of the filter within the output circuit may be changed without affecting the quality of the analog output signal. Accordingly, the filter could be placed after the pre-amplifier circuit An implementation using another type of filter will also be apparent to those skilled in the art.

We claim:

1. A read amplification circuit for transmitting a signal read by a read/write head from a magnetic medium to a read channel including an amplifier coupled to provide an amplified signal to a filter, which in turn is coupled to provide an amplified/filtered signal to a peak detector circuit, comprising:
   a. a pre-filter circuit within a single serial filtering path coupled to the read/write head for receiving and filtering the signal read from the magnetic medium, thereby forming a single filtered output signal; and
   b. an amplifier circuit coupled to the pre-filter circuit for receiving and amplifying the single filtered output signal, thereby forming a single amplified and filtered output signal and providing the single amplified and filtered output signal for transmission to the read channel.

2. The read amplification circuit as claimed in the claim 1 wherein the pre-filter circuit has a constant group delay.

3. The read amplification circuit as claimed in the claim 1 wherein the pre-filter circuit has an approximately constant frequency response up to a cut-off point.

4. The read amplification circuit as claimed in the claim 1 wherein the pre-filter circuit is a Bessel filter.

5. The read amplification circuit as claimed in the claim 1 wherein the pre-filter circuit is an equiripple filter.

6. The read amplification circuit as claimed in the claim 1 wherein the pre-filter circuit has a programmable cutoff frequency.

7. The read amplification circuit as claimed in the claim 6 wherein the cutoff frequency of the pre-filter is automatically controlled and inversely proportional to a write current.

8. A read amplification circuit for transmitting a signal read by a read/write head from a magnetic medium to a read channel including an amplifier coupled to provide an amplified signal to a filter, which in turn is coupled to provide an amplified/filtered signal to a peak detector circuit, comprising:
   a. an amplifier circuit coupled to the read/write head for receiving and amplifying the signal read from the magnetic medium, thereby forming an amplified output signal; and
   b. a pre-filter circuit within a single serial filtering path, coupled to the amplifier circuit for receiving and filtering the amplified output signal, thereby forming a single amplified and filtered output signal and providing the single amplified and filtered output signal for transmission to the read channel, wherein the pre-filter circuit has a programmable cutoff frequency which is automatically controlled and inversely proportional to a write current.

9. The read amplification circuit as claimed in the claim 8 wherein the pre-filter circuit has a constant group delay.

10. The read amplification circuit as claimed in the claim 8 wherein the pre-filter circuit has a constant frequency response.

11. The read amplification circuit as claimed in the claim 8 wherein the pre-filter circuit is a Bessel filter.

12. The read amplification circuit as claimed in the claim 8 wherein the pre-filter circuit is an equiripple filter.

13. A magnetic media storage system for storing and retrieving data, comprising:
   a. a magnetic medium on which data is stored and from which data is retrieved;
   b. a read/write head configured for writing data on the magnetic medium and reading data from the magnetic medium;
   c. a single serial filtering path including a pre-filter circuit configured for receiving a signal read by the read/write head from the magnetic medium for filtering the signal and then providing a single filtered output signal for transmission to a read channel including a read channel filter circuit; and
   d. an amplifier circuit coupled to the pre-filter circuit for amplifying the single filtered output signal and providing an amplified and filtered output signal for transmission to the read channel.

14. The magnetic media storage system as claimed in claim 13 wherein the pre-filter circuit has a constant group delay.

15. The magnetic media storage system as claimed in claim 13 wherein the pre-filter circuit has a constant frequency response.

16. The magnetic media storage system as claimed in claim 13 wherein the pre-filter circuit is a Bessel filter.

17. The magnetic media storage system as claimed in claim 13 wherein the pre-filter circuit is an equiripple filter.

18. The magnetic media storage system as claimed in claim 13 wherein the pre-filter circuit has a programmable cutoff frequency.

19. The magnetic media storage system as claimed in claim 18 wherein the cutoff frequency of the pre-filter is automatically controlled and inversely proportional to a write current.

20. The magnetic media storage system as claimed in claim 13 wherein the amplifier circuit is coupled between the read/write head and the pre-filter for amplifying the signal read by the read/write head before it is filtered by the pre-filter circuit, thereby providing an amplified and filtered output signal for transmission to the read channel.

21. The magnetic media storage system as claimed in claim 20 wherein the pre-filter circuit has a constant group delay.

22. The magnetic media storage system as claimed in claim 20 wherein the pre-filter circuit has a constant frequency response.

23. The magnetic media storage system as claimed in claim 20 wherein the pre-filter circuit is a Bessel filter.

24. The magnetic media storage system as claimed in claim 20 wherein the pre-filter circuit is an equiripple filter.

25. The magnetic media storage system as claimed in claim 20 wherein the pre-filter circuit has a programmable cutoff frequency.

26. The magnetic media storage system as claimed in claim 25 wherein the cutoff frequency of the pre-filter is automatically controlled and inversely proportional to a write current.

27. A system for storing and retrieving data, comprising:
   a. a hard disk drive including:
      i. a magnetic medium on which data is stored and from which data is retrieved;
      ii. a read/write head configured for writing data on the magnetic medium and reading data from the magnetic medium; and
      iii. a single serial filtering path including a pre-filter circuit configured for receiving a signal read by the read/write head from the magnetic medium for filtering the signal and providing a first filtered output signal;
   b. a read channel configured for receiving the first filtered output signal including:
      i. a read channel amplifier circuit for amplifying the first filtered output signal and providing an amplified signal;
      ii. a read channel filter circuit coupled to the read channel amplifier circuit for filtering the amplified signal and providing an amplified/filtered signal;
      iii. a peak detection circuit coupled to the read channel filter circuit for detecting peaks in the amplified/filtered signal and providing an output signal representing data read from the magnetic medium within the hard disk drive; and
   c. a transmission cable coupled between the hard disk drive and the read channel for providing the first filtered output signal to the read channel.

* * * * *

UNITED STATES PATENT AND TRADEMARK OFFICE
CERTIFICATE OF CORRECTION

PATENT NO. : 6,307,693 B1  
DATED : October 23, 2001  
INVENTOR(S) : Bernard J. Griffiths et al.

Page 1 of 1

It is certified that error appears in the above-identified patent and that said Letters Patent is hereby corrected as shown below:

<u>Title page,</u>  
Item [56] References Cited, the following U.S. PATENT DOCUMENTS need to be added:

-- 4,616,273    10/1986    Ishii et al.    360/66  
      4,964,139    10/1990    Wash et al.   360/40  
      5,384,671    01/1995    Fisher        360/51  
      5,592,340    01/1997    Minuhin et al. 360/65  
      5,615,223    03/1997    Carr          360/46 --.

Signed and Sealed this

Twenty-first Day of May, 2002

Attest:

Attesting Officer

JAMES E. ROGAN  
*Director of the United States Patent and Trademark Office*